US012577155B2

(12) United States Patent
Hitomi et al.

(10) Patent No.: US 12,577,155 B2
(45) Date of Patent: Mar. 17, 2026

(54) LAYERED FORMED SHEET AND METHOD FOR MANUFACTURING THE SAME

(71) Applicant: KURARAY CO., LTD., Kurashiki (JP)

(72) Inventors: Yoshinori Hitomi, Okayama (JP);
Akira Imagawa, Okayama (JP);
Takafumi Horikoshi, Okayama (JP);
Atsuhisa Ogawa, Okayama (JP);
Yoshihiro Iwasaki, Osaka (JP); Hisashi Suemori, Kurashiki (JP); Yoshihiro Higashimoto, Yamatokoriyama (JP)

(73) Assignee: KURARAY CO., LTD., Kurashiki (JP)

( * ) Notice: Subject to any disclaimer, the term of this patent is extended or adjusted under 35 U.S.C. 154(b) by 499 days.

(21) Appl. No.: 18/013,286

(22) PCT Filed: Jun. 28, 2021

(86) PCT No.: PCT/JP2021/024320
§ 371 (c)(1),
(2) Date: Dec. 28, 2022

(87) PCT Pub. No.: WO2022/004640
PCT Pub. Date: Jan. 6, 2022

(65) Prior Publication Data
US 2023/0271881 A1      Aug. 31, 2023

(30) Foreign Application Priority Data

Jun. 29, 2020     (JP) ................................. 2020-111483

(51) Int. Cl.
| | |
|---|---|
| *C04B 7/153* | (2006.01) |
| *B28B 1/42* | (2006.01) |
| *C04B 16/02* | (2006.01) |
| *C04B 16/06* | (2006.01) |
| *C04B 22/06* | (2006.01) |

(52) U.S. Cl.
CPC ............... *C04B 7/153* (2013.01); *B28B 1/42* (2013.01); *C04B 16/02* (2013.01); *C04B 16/0641* (2013.01); *C04B 22/064* (2013.01)

(58) Field of Classification Search
CPC ..... C04B 7/153; C04B 16/02; C04B 16/0641; C04B 22/064; C04B 28/006; C04B 2111/00612; B28B 1/42; B28B 1/527; Y02W 30/91
See application file for complete search history.

(56) References Cited

U.S. PATENT DOCUMENTS

| | | | | |
|---|---|---|---|---|
| 8,187,423 B1* | 5/2012 | Glenn | .................. | B29C 70/443 |
| | | | | 264/316 |
| 2013/0263760 A1* | 10/2013 | Terai | ......................... | C04B 7/04 |
| | | | | 106/707 |
| 2016/0068735 A1* | 3/2016 | Biddle | ..................... | C09K 8/48 |
| | | | | 507/140 |
| 2019/0152854 A1 | 5/2019 | Schlesinger et al. | | |
| 2020/0369570 A1 | 11/2020 | Inada et al. | | |

FOREIGN PATENT DOCUMENTS

| | | | |
|---|---|---|---|
| CN | 109206100 A | 1/2019 | |
| JP | 2006076874 A | 3/2006 | |
| JP | 2009084409 A | 4/2009 | |
| JP | 4453876 B2 * | 4/2010 | |
| JP | 2013216534 A | 10/2013 | |
| JP | 2019513677 A | 5/2019 | |
| JP | 2019116393 A | 7/2019 | |
| WO | WO-2019131321 A1 | 7/2019 | |

OTHER PUBLICATIONS

International Preliminary Report on Patentability and Written Opinion issued Dec. 13, 2022 in PCT/JP2021/024320, 4 pages.
International Search Report issued Aug. 24, 2021 in PCT/JP2021/024320, 2 pages.
Extended European Search Report issued Jun. 25, 2024 in corresponding European Patent Application No. 21832395.4, 8 pages.

* cited by examiner

*Primary Examiner* — Pamela H Weiss
(74) *Attorney, Agent, or Firm* — Element IP, PLC

(57) ABSTRACT

The present invention relates to a layered formed sheet comprising two or more formed sheets each formed from a curable composition comprising (A) an aluminosilicate source, (B) an alkaline metal hydroxide, (C) cellulose-based fibers and (D) alkali-resistant fibers other than cellulose-based fibers, in which the aluminosilicate source (A) comprises a blast furnace slag, and the content of a blast furnace slag having a specific surface area of 1000 cm²/g or more and 9000 cm²/g or less is more than 55% by mass and 90% by mass or less related to a total solid content in the curable composition.

9 Claims, No Drawings

LAYERED FORMED SHEET AND METHOD FOR MANUFACTURING THE SAME

TECHNICAL FIELD

The present invention relates to a layered formed sheet and a method for manufacturing the same.

BACKGROUND ART

Heretofore, a cementitious board made by a paper-making method has been produced by forming a sheet by a paper-making method in which a slurry prepared by suspending cement and fibers in an aqueous medium is scooped with a mesh, and then curing the sheet. The paper-making method has been utilized in wide varieties of fields because of its general-purpose versatility, and has been utilized particularly as a ceiling material, an interior material, an exterior material, a flooring material and the like in an architecture field. However, huge energy is required for the production of cement, and the discharge of a large amount of carbon dioxide associated with the huge energy has been seen as a problem. In recent years, studies have been made on an inorganic polymer produced by the reaction of an aluminosilicate with an alkali metal silicate. The inorganic polymer has been focused, because the inorganic polymer is superior with respect to durability and acid resistance compared with cementitious materials and the amount of carbon dioxide discharged during a period from the production of raw materials for the inorganic polymer and the production of the inorganic polymer is significantly small, and therefore the inorganic polymer is believed as an environment-friendly material.

For example, Patent Document 1 discloses an inorganic sheet characterized by being a cured composite of a mat produced by dehydrating a slurry which contains a blast furnace slag in an amount of 30 to 53% by mass, a gypsum having an average particle diameter of 200 to 2000 μm in an amount of 2 to 5% by mass, an alkaline material in an amount of 5 to 11% by mass, reinforcing fibers in an amount of 5 to 15% by mass and an inorganic admixture in an amount of 31 to 50% by mass related to the total solid content, and has a (blast furnace slag):(gypsum):(alkaline material) ratio of 1:(0.05 to 0.15):(0.15 to 0.35) by mass, and then forming the dehydrated product.

Patent Document 2 discloses a non-asbestos hydraulic sheet made by a paper-making method, which is characterized by containing polyvinyl alcohol-based fibers having a cross-sectional circularity of 40 to 70% in an amount of 1.0 to 2.0% by mass related to the total solid content and eucalyptus pulp having a freeness of 100 to 500 ml in an amount of 2.0 to 4.0% by mass related to the total solid content and also characterized by having interlayer adhesion strength of 2.0 N/mm$^2$ or more and a dimensional change ratio of 0.25% or less.

PRIOR ART DOCUMENT

Patent Documents

Patent Document 1: JP-A-2013-216534
Patent Document 2: JP-A-2006-076874
Patent Document 3: WO 2019/131321

SUMMARY OF THE INVENTION

Problems to be Solved by the Invention

However, a non-cementitious board made by a paper-making method which has more superior properties has been still required. In Patent Document 1, a blast furnace slag is blended as an environment-friendly raw material. However, the blend amount of the blast furnace slag is too small. Therefore, the bending strength of the board is poor, and further improvement in the dimensional stability of the board is required.

Patent Document 3 discloses a formed composite formed from a curable composition containing (A) at least one aluminosilicate source, (B) an alkali metal hydroxide, (C) a calcium ion supply source and (D) alkali-resistant fibers, in which the aluminosilicate source (A) contains a specific aluminosilicate source. This formed composite is produced by a forming method such as a casting method, a dehydration molding method, an injection molding method and an extrusion method. In this document, a board made by a paper-making method is excluded from the scope of the invention.

In these situations, the present invention addresses the problem of providing a layered formed sheet that is reinforced with fibers and has high bending strength, high impact strength and high dimensional stability.

Solutions to the Problems

For the purpose of solving the problem, the present inventors have made extensive and intensive studies about layered formed sheets. As a result, the present invention is accomplished. The present invention includes the following preferred aspects.

[1] A layered formed sheet comprising two or more formed sheets each formed from a curable composition comprising (A) an aluminosilicate source, (B) an alkaline metal hydroxide, (C) cellulose-based fibers and (D) alkali-resistant fibers other than cellulose-based fibers, in which the aluminosilicate source (A) comprises a blast furnace slag, and the content of a blast furnace slag having a specific surface area of 1000 cm$^2$/g or more and 9000 cm$^2$/g or less is more than 55% by mass and 90% by mass or less related to a total solid content in the curable composition.

[2] The layered formed sheet according to [1], wherein the content of the alkaline metal hydroxide (B) is 3% by mass or more and 45% by mass ore less related to a total solid content in the curable composition.

[3] The layered formed sheet according to [1] or [2], wherein the content of the cellulose-based fibers (C) is 0.5% by mass or more and 15% by mass or less related to a total solid content in the layered formed sheet.

[4] The layered formed sheet according to any one of [1] to [3], wherein the content of the alkali-resistant fibers other than cellulose-based fibers (D) is 0.1% by mass or more and 5% by mass or less related to a total solid content in the layered formed sheet.

[5] The layered formed sheet according to any one of [1] to [4], wherein the aluminosilicate source (A) further contains at least one selected from the group consisting of fly ash, metakaolin and red mud in a content of 1% by mass or more and 35% by mass or less related to a total solid content in the curable composition.

[6] The layered formed sheet according to any one of [1] to [5], wherein the alkaline metal hydroxide (B) is slaked lime.

[7] The layered formed sheet according to any one of [1] to [6], wherein the cellulose-based fibers (C) is pulp.

[8] The layered formed sheet according to any one of [1] to [7], wherein the alkali-resistant fibers other than cellulose-based fibers (D) have an average fiber diameter of 100 μm or less and an aspect ratio of 50 or more and 2000 or less. [9] The layered formed sheet according to any one of [1] to [8], wherein the alkali-resistant fibers other than cellulose-based fibers (D) are at least one type of fibers selected from the group consisting of polyvinyl alcohol-based fibers, polyethylene fibers, polypropylene fibers, acrylic fibers, aramid fibers and nylon fibers.

[10] The layered formed sheet according to any one of [1] to [9], wherein an impact strength of the layered formed sheet is 2 kJ/m$^2$ or more as measured in accordance with JIS K 7111.

[11] A method for manufacturing a layered formed sheet according to any one of [1] to [10], the method comprising:

a step for mixing an aluminosilicate source (A), an alkaline metal hydroxide (B), cellulose-based fibers (C), alkali-resistant fibers other than cellulose-based fibers (D) and water together to prepare a curable composition;

a step for producing a formed sheet by a paper-making method using the curable composition; and a step for laminating two or more of the formed sheets on each other.

[12] The method according to [11], wherein the step for producing the formed sheet by the paper-making method comprises scooping the curable composition with a cylinder wire.

Effects of the Invention

According to the present invention, a layered formed sheet that is reinforced with fibers and has high bending strength, high impact strength and high dimensional stability can be provided.

EMBODIMENTS OF THE INVENTION

The layered formed sheet according to the present invention comprises two or more formed sheets each formed from a curable composition comprising (A) an aluminosilicate source, (B) an alkaline metal hydroxide, (C) cellulose-based fibers and (D) alkali-resistant fibers other than cellulose-based fibers. The aluminosilicate source (A) contains a blast furnace slag, in which the content of a blast furnace slag having a specific surface area of 1000 cm$^2$/g to 9000 cm$^2$/g is more than 55% by mass and 90% by mass or less related to a total solid content in the curable composition.

<(A) Aluminosilicate Source>

The aluminosilicate source contains an aluminosilicate (xM$_2$O·yAl$_2$O$_3$·zSiO$_2$·nH$_2$O, wherein M represents an alkali metal) as a main component. The term "main component" as used herein refers to a component contained in a largest mass in the aluminosilicate source. The aluminosilicate source elutes cations such as aluminum ions and silicon ions upon the contact with a highly alkaline solution [an aqueous solution of an alkaline metal hydroxide (B)], and the aluminosilicate source are polycondensed to form a strong SiO$_4$·AlO$_4$ polymer network.

The aluminosilicate source (A) to be used in the present invention contains a blast furnace slag. Therefore, according to the present invention, a blast furnace slag that is a waste material produced in an iron-making process can be effectively utilized.

The present inventors have found that the following matters can be considered. That is, when the specific surface area of a blast furnace slag is too small, there are little reaction sites in the blast furnace slag, resulting in insufficient progression of a curing reaction. On the other hand, when the specific surface area of a blast furnace slag is too large, the average particle diameter of the blast furnace slag becomes smaller, the blast furnace slag cannot be trapped by a papermaking screen when, for example, the layered formed sheet is produced by a paper-making method, resulting in the reduction in the ratio of the blast furnace slag in a solid content scooped with the screen. In addition, the present inventors have made studies about blast furnace slags in detail, and, as a result, have found that, in a layered formed sheet comprising two or more formed sheets each formed from a curable composition comprising the components (A) to (D), the layered formed sheet can have high bending strength, high impact strength and high dimensional stability when the content of a blast furnace slag having a specific surface area of 1000 cm$^2$/g to 9000 cm$^2$/g is more than 55% by mass and 90% by mass or less related to a total solid content in the curable composition. If the content is 55% by mass or less, it is difficult to impart desired bending strength, impact strength and dimensional stability to the layered formed sheet. If the content is 90% by mass or more, it is difficult to impart desired bending strength, impact strength and dimensional stability to the layered formed sheet. This is assumed to be due to the too high content of the blast furnace slag, whereby an optimum blend ratio among the alkaline metal hydroxide (B), the cellulose-based fibers (C) and the alkali-resistant fibers (D) cannot be achieved. However, the above-mentioned mechanisms are all supposition, and the present invention is not limited to those.

Furthermore, even when the curable composition contains a blast furnace slag having a specific surface area of smaller than 1000 cm$^2$/g in an amount of more than 55% by mass related to a total solid content in the curable composition, it is difficult to produce a layered formed sheet having desired bending strength, impact strength and dimensional change ratio. Even when the curable composition contains a blast furnace slag having a specific surface area of more than 9000 cm$^2$/g in an amount of 60% by mass or more related to a total solid content in the curable composition, it is also difficult to produce a layered formed sheet having desired bending strength, impact strength and dimensional change ratio.

The content of the blast furnace slag having the specified specific surface area is preferably 60% by mass or more, more preferably 62% by mass or more, still more preferably 65% by mass or more, particularly preferably 68% by mass or more, and is preferably 85% by mass or less, more preferably 82% by mass or less, still more preferably 80% by mass or less, particularly preferably 75% by mass or less. When the content is equal to or more than the above-mentioned lower limit and equal to or less than the above-mentioned upper limit, for example, in the production of the layered formed sheet by a paper-making method, the blast furnace slag having sufficient reaction sites is contained at a sufficient ratio in a solid content scooped with the screen, an optimum blend ratio among the alkaline metal hydroxide (B), the cellulose-based fibers (C) and the alkali-resistant fibers (D) can be achieved. As a result, higher bending strength, higher impact strength and higher dimensional stability can be achieved in the produced layered formed sheet.

The specific surface area of the blast furnace slag contained at a content of more than 55% by mass and 90% by mass or less related to a total solid content in the curable composition is preferably 2000 cm$^2$/g or more, more preferably 3000 cm$^2$/g or more, preferably 8000 cm$^2$/g or less, more preferably 7000 cm$^2$/g or less. When the specific surface area of the blast furnace slag is equal to or more than the above-mentioned lower limit and equal to or less than the above-mentioned upper limit, the blast furnace slag can have sufficient reaction sites and can have a suitable average particle diameter. As a result, higher bending strength, higher impact strength and higher dimensional stability can be achieved in the produced layered formed sheet. The specific surface area of the blast furnace slag can be adjusted to a value that is equal to or more than the above-mentioned lower limit and equal to or less than the above-mentioned upper limit by, for example, pulverizing the blast furnace slag, then classifying the pulverized product, and using a specific fraction among the classified fractions. The specific surface area of the blast furnace slag can be measured by, for example, a laser diffraction/scattering method.

Blast furnace slags are commercially available, and products each having a specific surface area of 1000 $cm^2/g$ or more or 9000 $cm^2/g$ or less may be used singly or two or more of them may be used in combination.

The types of the blast furnace slag include an air-cooled slag that has a crystalline form and a granulated slag that has an amorphous form, and either one of these slags can be used in the present invention. From the viewpoint of further improving the strength of the layered formed sheet and further promoting the curing of the layered formed sheet, granulated slag is preferably used.

Preferred examples of the aluminosilicate source (A) other than the blast furnace slag having the specified specific surface area include: an industrial waste material such as fly ash, red mud and sewage sludge burned ash; naturally occurring aluminosilicate minerals and calcined products thereof (e.g., metakaolin); and volcanic ash. These substances are commercially available. In the present invention, these substances may be used singly, or two or more of them may be used in combination. As long as the effects of the present invention cannot be deteriorated, the curable composition in the present invention may contain a blast furnace slag having a specific surface area of less than 1000 $cm^2/g$ and/or a blast furnace slag having a specific surface area of more than 9000 $cm^2/g$.

In one aspect of the present invention, the aluminosilicate source (A) also contains at least one selected from the group consisting of fly ash, metakaolin and red mud at a content of preferably 1% by mass or more, preferably 35% by mass or less, related to a total solid content in the curable composition, in addition to the blast furnace slag having the specified specific surface area. In this aspect, the density of a cured composite can be increased compared with that achieved when the blast furnace slag is used alone as the aluminosilicate source (A). As a result, a layered formed sheet having higher bending strength, higher impact strength and higher dimensional stability can be produced. In this aspect, the content is more preferably 3% by mass or more, still more preferably 4% by mass or more, furthermore preferably 5% by mass or more, particularly preferably 6% by mass or more, and is more preferably 34% by mass or less, still more preferably 33% by mass or less, furthermore preferably 32% by mass or less, particularly preferably 30% by mass or less (e.g., 28% by mass or less, 26% by mass or less, 24% by mass or less, 22% by mass or less, 20% by mass or less, 18% by mass or less). In a preferred aspect, the content is preferably 15% by mass or less, more preferably 13% by mass or less, still more preferably 12% by mass or less, particularly preferably 10% by mass or less. When fly ash is contained as the aluminosilicate source (A), the content of fly ash is preferably 1% by mass or more, still more preferably 3% by mass or more, still more preferably 4% by mass or more, and is preferably 25% by mass or less, more preferably 23% by mass or less, still more preferably 21% by mass or less, furthermore preferably 15% by mass or less, particularly preferably 13% by mass or less, particularly more preferably 12% by mass or less, related to a total solid content in the curable composition. The content of fly ash may be 5% by mass or more, 6 by mass or more, or 8% by mass or more, or may be 7% by mass or less, or 6% by mass or less. When red mud is contained as the aluminosilicate source (A), the content of red mud is preferably 1% by mass or more, more preferably 3% by mass or more, still more preferably 4% by mass or more, furthermore preferably 5% by mass or more, still furthermore preferably 7% by mass or more, particularly preferably 9% by mass or more, especially preferably 11% by mass or more, and is preferably 35% by mass or less, more preferably 33% by mass or less, still more preferably 30% by mass or less, furthermore preferably 28% by mass or less, particularly preferably 25% by mass or less, particularly more preferably 20% by mass or less, related to a total solid content in the curable composition. The content of red mud may be 15% by mass or more, or 20% by mass or more, or may be 15% by mass or less, or 10% by mass or less, or 8% by mass or less, or 6% by mass or less. The content of the blast furnace slag having the specified specific surface area is preferably 56% by mass or more, more preferably 57% by mass or more, still more preferably 58% by mass or more, furthermore preferably 60% by mass or more, particularly preferably 62% by mass or more (in one aspect, for example 64% by mass or more, preferably 67% by mass or more, more preferably 70% by mass or more), and is preferably 87% by mass or less, more preferably 84% by mass or less, still more preferably 82% by mass or less, furthermore preferably 78% by mass or less (in one aspect, 77% by mass or less, for example), related to a total solid content in the curable composition. When the content is equal to or more than the above-mentioned lower limit and equal to or less than the above-mentioned upper limit, the effects caused by the addition of at least one selected from the group consisting of fly ash, metakaolin and red mud can be achieved.

<(B) Alkaline Metal Hydroxide>

The alkaline metal hydroxide (B) to be used in the present invention shows high alkalescency in water, and has an activity to activate the aluminosilicate source (A) and elute cations such as Al ions and Si ions upon the contact with the aluminosilicate source (A).

Examples of the alkaline metal hydroxide (B) include slaked lime, unslaked lime and sodium hydroxide. From the viewpoint that the problems of the flowing out of the metal hydroxide into process circulating water or the dilution of the metal hydroxide by the process circulating water in the paper-making method can be avoided, it is preferred to use slaked lime as the alkaline metal hydroxide (B).

The content of the alkaline metal hydroxide (B) is preferably 3% by mass or more, more preferably 4% by mass or more, still more preferably 6% by mass or more, furthermore preferably 7% by mass or more, particularly preferably 8% by mass or more, and is more preferably 45% by mass or less, still more preferably 43% by mass or less, particularly preferably 41% by mass or less, related to a total solid content in the curable composition. In a preferred aspect, the content is preferably 10% by mass or more, and is preferably 30% by mass or less, more preferably 25% by mass or less, still more preferably 22% by mass or less, particularly preferably 20% by mass or less, related to a total solid content in the curable composition. When the content is equal to or more than the above-mentioned lower limit and equal to or less than the above-mentioned upper limit, higher bending strength, higher impact strength and higher dimensional stability can be achieved in a produced layered formed sheet.

<(C) Cellulose-Based Fibers>

The cellulose-based fibers (C) to be used in the present invention have an effect to improve the bending strength and impact strength of the layered formed sheet.

Examples of the cellulose-based fibers (C) include rayon fibers (including polynosic rayon fibers and organic solvent-based cellulose fibers), acetate-based fibers, and natural cellulose-based fibers such as natural pulp (e.g., wood pulp, cotton linter pulp, hemp, pulp). Among these fibers, from the viewpoint that the yield in the cylinder wire process during the sheet making in the paper-making method can be improved, it is preferred to use natural pulp, more preferably pulp. Therefore, in a preferred aspect of the present invention, the cellulose-based fibers (C) are pulp.

The pulp may be or may not be subjected to a beating treatment. From the viewpoint that desired bending strength and impact strength can be achieved, it is preferred to use beaten pulp, and it is more preferred to use pulp having a CSF value, which indicates a degree of beating in accordance with Canadian standard in a freeness test method prescribed in JIS P8121-1976, of 50 to 400 mL, more preferably 100 to 150 mL.

As the pulp, wide varieties of types of pulp can be used. Examples of the pulp include a needle leaf tree, a broadleaf tree, Manila hemp, paper bush (*Edgeworthia chrysantha*), paper mulberry (*Broussonetia kazinoki*), ganpi (*Diplomorpha sikokiana*), sarago (*Wikstroemia* spp.), maluberry, straw, bamboo, reed grass, saby, lalang, esparto, bagasse, sisal, kenaf, linter, banana and recycled water-paper. Examples of the needle leaf tree includes needle leaf trees belonging to the families Taxodiaceae, Pinaceae, Cupressaceae and Araucariaceae. Examples of the broadleaf tree include broadleaf trees belonging to the family Ulmaceae, Fagaceae, Myrtaceae, Cercidiphyllaceae, Oleaceae, Rutaceae, Betulaceae, Aceraceae, Juglandaceae, Tiliaceae, Araliaceae, Sapotaceae, Celastraceae, Apocynaceae, Verbenaceae, Magnoliaceae and Sterculiaceae. These pulps may be bleached pulp or non-bleached pulp. These pulps may be used singly, or two or more of them may be used in combination.

The content of the cellulose-based fibers (C) is preferably 0.5% by mass or more, more preferably 1% by mass or more, still more preferably 2% by mass or more, particularly preferably 3% by mass or more, and is more preferably 15% by mass or less, more preferably 10% by mass or less, still more preferably 9% by mass or less, particularly preferably 5% by mass or less, related to a total solid content in the layered formed sheet. When the content is equal to or more than the above-mentioned lower limit, the blast furnace slag can be trapped by the papermaking screen sufficiently when, for example, a layered formed sheet is produced by the paper-making method and consequently satisfactory yield can be achieved. Furthermore, the blast furnace slag can be contained in a sufficient content in a solid material scooped with the screen, and therefore desired bending strength and impact strength can be achieved. When the content is equal to or less than the above-mentioned upper limit, problems such as the deterioration in water resistance of the layered formed sheet and the deterioration in an effect to prevent the invasion of a corrosive substance (chlorine, carbon dioxide gas, and sulfate ions, and various organic acids such as sulfate ions) can be avoided.

8

<(D) Alkali-Resistant Fibers Other than Cellulose-Based Fibers>

The alkali-resistant fibers other than cellulose-based fibers (D) which is to be used in the present invention have an effect to improve the bending strength and impact strength of the layered formed sheet. It is found that the reinforcing effect by the fibers can be improved when the cellulose-based fibers (C) and the alkali-resistant fibers other than cellulose-based fibers (D) (wherein the alkali-resistant fibers other than cellulose-based fibers (D) are also referred to as "alkali-resistant fibers (D)", hereinafter) are used in combination.

The alkali-resistant fibers (D) may be any one of inorganic fibers or organic fibers, as long as the fibers can have chemical durability against alkalis. Examples of the alkali-resistant inorganic fibers include alkali-resistant glass fibers and carbon fibers. Examples of the alkali-resistant organic fibers include various alkali-resistant fibers such as polyvinyl alcohol (also abbreviated as "PVA", hereinafter)-based fibers, polyolefin-based fibers (e.g., polyethylene fibers and polypropylene fibers), ultra-high-molecular-weight polyethylene fibers, polyamide-based fibers (e.g., polyamide 6, polyamide 6,6, and polyamide 6,10), aramid fibers (particularly para-aramid fibers), poly-p-phenylenebenzobisoxazole-based fibers [e.g., poly-p-phenylenebenzoxazole (PBO) fibers], nylon fibers, acrylic fibers, polyphenylene sulfide fibers (PPS fibers), and polyether ether ketone fibers (PEEK fibers). These types of alkali-resistant fibers may be used singly, or two or more of them may be used in combination.

Among these fibers, polyvinyl alcohol-based fibers, polyethylene fibers, polypropylene fibers, acrylic fibers, aramid fibers and nylon fibers are preferably used, from the viewpoint that more superior reinforcing properties can be imparted to the layered formed sheet and the layered formed sheet can be produced at lower cost. Therefore, in one aspect of the present invention, the alkali-resistant fibers other than cellulose-based fibers (D) may be at least one type of fibers selected from the group consisting of polyvinyl alcohol-based fibers, polyethylene fibers, polypropylene fibers, acrylic fibers, aramid fibers and nylon fibers.

The average fiber diameter of the alkali-resistant fibers (D) is preferably 100 μm or less, more preferably 80 μm or less, still more preferably 50 μm or less, and is preferably 3 μm or more, more preferably 5 μm or more, still more preferably 7 μm or more. When the average fiber diameter of the alkali-resistant fibers (D) is equal to or less than the above-mentioned upper limit, the alkali-resistant fibers can also have sufficient fiber strength and can be produced on an industrial sale stably. When the average fiber diameter of the alkali-resistant fibers (D) is equal to or more than the above-mentioned lower limit, the fiber can be dispersed more uniformly in a polymer matrix. The term "polymer matrix" as used herein (also simply referred to as "matrix", hereinafter) refers to a polymer part that binds to the alkali-resistant fibers in the layered formed sheet.

Each of the alkali-resistant fibers (D) has an aspect ratio of preferably 50 or more, more preferably 150 or more, still more preferably 200 or more, and preferably 2000 or less, more preferably 1200 or less, still more preferably 800 or less, from the viewpoint that both of satisfactory dispersibility of the fibers in the curable composition and satisfactory reinforcing properties after the curing of the curable composition can be achieved. The term "aspect ratio" as used herein refers to a ratio (L/D) of an average fiber length L and an average fiber diameter D.

The average fiber diameter and the aspect ratio of the alkali-resistant fibers (D) can be determined in accordance with "chemical fiber staple test method (8.5.1)" prescribed in JIS L 1015".

From the viewpoint that both of the satisfactory dispersibility of the fibers in the curable composition and the satisfactory reinforcing properties after the curing of the curable composition can be achieved, the average fiber length of the alkali-resistant fibers (D) is preferably 0.5 mm to 20 mm, more preferably 1 mm to 15 mm.

The fiber tensile strength of the alkali-resistant fibers (D) in the present invention is preferably 3 cN/dtex or more, more preferably 5 cN/dtex or more, particularly preferably 7 cN/dtex or more. When the fiber tensile strength of the alkali-resistant fibers is equal to or more than the above-mentioned lower limit, the reinforcing performance for the layered formed sheet can be improved. The upper limit of the fiber tensile strength of the alkali-resistant fibers (D) in the present invention can be set appropriately depending on the types of the fibers, and is, for example, 30 cN/dtex or less. The fiber tensile strength can be determined in accordance with "chemical fiber staple test method (8.5.1)" prescribed in JIS L 1015.

When PVA-based fibers, e.g., vinylon fibers, are used as the alkali-resistant fibers (D), PVA-based fibers having the following properties may be used. The polymerization degree of a PVA-based polymer constituting the PVA-based fibers may be selected appropriately depending on the intended use, and is not particularly limited. With taking the mechanical properties and the like of the produced fibers into consideration, the average polymerization degree of the PVA-based polymer determined from the viscosity of an aqueous solution at 30° C. is preferably about 500 to 20000, more preferably about 800 to 15000, particularly preferably about 1000 to 10000. From the viewpoint of the strength of the produced fibers, the average polymerization degree of the PVA-based polymer is preferably 1000 or more, more preferably 1200 or more, more preferably 1500 or more, particularly preferably 1750 or more. The PVA-based polymer may be a medium-polymerization-degree product having an average polymerization degree of 1000 or more and less than 3000, or may be a high-polymerization-degree product having an average polymerization degree of 3000 or more.

The saponification degree of the PVA-based polymer may also be selected appropriately depending on the intended use, and is not particularly limited. From the viewpoint of the dynamic properties of the produced fibers, the saponification degree of the PVA-based polymer may be for example 95 mol % or more, preferably 98 mol % or more. The saponification degree of the PVA-based polymer may be 99 mol % or more, and may be 99.8 mol % or more. When the saponification degree of the PVA-based polymer is equal to or more than the above-mentioned lower limit, satisfactory mechanical properties, satisfactory process passing properties, satisfactory cost for the production and the like of the produced fibers can be achieved.

The PVA-based fibers to be used in the present invention can be produced by dissolving the PVA-based polymer in a solvent, spinning the resultant solution by any one of a wet process, a dry-wet process or a dry process, and subjecting the spun product to dry heat stretching. The wet spinning is a method for ejecting a spinning stock solution into a curing bath through a spinning nozzle directly. The dry-wet spinning is a method for ejecting a spinning stock solution into air or an inert gas located apart by an arbitrary distance temporality through a spinning nozzle and subsequently introducing the spinning stock solution into a curing bath. The dry spinning is a method for ejecting a spinning stock solution into air or an inert gas. After the spinning, the PVA-based fibers may be subjected to a stretching treatment, if necessary. In addition, the PVA-based fibers may be subjected to an acetalization treatment or the like that has been employed commonly for PVA-based fibers.

The solvent to be used in the spinning stock solution of the PVA-based fibers is not particularly limited, as long as PVA can be dissolved in the solvent. Examples of the solvent include water, dimethyl sulfoxide (DMSO), dimethylformamide, dimethylacetamide and a polyhydric alcohol (e.g., glycerine, ethylene glycol, triethylene glycol). These solvents may be used singly, or two or more of them may be used in combination. In the present invention, when wet spinning is performed, it is preferred to use water or an organic solvent as the solvent. Among these solvents, from the viewpoint of the easiness of feeding of the solvent and the influence of the solvent on an environment impact, water and DMSO are particularly preferred. The concentration of the polymer in the spinning stock solution may be varied depending on the composition and polymerization degree of the PVA-based polymer and the type of the solvent, and is generally 6 to 60% by mass.

In the dry spinning, the above-mentioned solvent may be used. In this case, water may be used, or an organic solvent may be used.

As long as the effects of the present invention cannot be deteriorated, in addition to the PVA-based polymer, an additive or the like may also be contained in the spinning stock solution depending on the intended use. Examples of the additive include boric acid, a surfactant, an antioxidant agent, a decomposition inhibitor, an anti-freezing agent, a pH modifier, a masking agent, a coloring agent and an oil agent.

The solvent to be used in the curing bath may be selected appropriately depending on the types of the solvent used in the spinning stock solution. When the spinning stock solution is an aqueous solution, as the curing bath, an aqueous solution or an alkaline aqueous solution of an inorganic salt that has a curing capability for a PVA-based polymer (e.g., sodium sulfate, ammonium sulfate, sodium carbonate, sodium hydroxide) may be used. When the spinning stock solution is a solution in an organic solvent, as the curing bath, an organic solvent having a curing capability for a PVA-based polymer, including an alcohol such as methanol, ethanol, propanol and butanol and a ketone such as acetone, methyl ethyl ketone and methyl isobutyl ketone, may be used.

In the present invention, PVA-based fibers produced by the dry spinning or PVA-based fibers produced from a spinning stock solution containing water or an organic solvent as the solvent by wet spinning are preferred from the viewpoint of fiber tensile strength.

For the purpose of removing the solvent of the spinning stock solution from a cured raw yarn by extraction, the raw yarn may be passed through an extraction bath, or may be subjected to wet stretching simultaneously with the extraction. In addition, the fibers may be dried if necessary after the wet-stretching, or may be further subjected to dry heat stretching. When the stretching is carried out, the stretching may be carried out at a total draw ratio (i.e., a product of a draw ratio in wet stretching and a draw ratio after drying) of for example 5 to 25 times, preferably about 8 to 20 times.

As the alkali-resistant fibers (D), commercially available fibers may be used. Examples of the commercially available fibers include: organic fibers such as polyvinyl alcohol-based fibers manufactured by Kuraray Co., Ltd., polypropylene fibers manufactured by Daiwabo Co., Ltd., and nylon fibers manufactured by Toray Industries, Inc.; and inorganic fibers such as glass fibers manufactured by Nippon Electric Glass Co., Ltd. and Taiheiyo Materials Corporation.

In one aspect of the present invention, the content of the alkali-resistant fibers (D) is preferably 0.1% by mass or more, more preferably 0.2% by mass or more, still more preferably 0.3% by mass or more, and is preferably 5% by mass or less, more preferably 4% by mass or less, still more preferably 3% by mass or less, related to a total solid content in the layered formed sheet. When the content of the alkali-resistant fibers (D) is equal to or more than the above-mentioned lower limit and equal to or less than the above-mentioned upper limit, higher bending strength and higher impact strength can be achieved in the produced layered formed sheet. The content of the alkali-resistant fibers (D) in the layered formed sheet can be measured by the following procedure. Firstly, the layered formed sheet is dried at 105° C. until the mass of the layered formed sheet reaches a constant value, and was then weighed ($W_1$ (g)). Subsequently, the layered formed sheet is pulverized with a mortar, then water is added to a pulverized product, and then the resultant mixture is filtrated through a metal mesh (e.g., a 55-mesh metal mesh) to separate the alkali-resistant fibers (D) and the cellulose-based fibers (C) from a matrix. The alkali-resistant fibers (D) and the cellulose-based fibers (C) thus separated is dried at 105° C. until the mass of the dried product reaches a constant value, then the dried product is immersed in a copper oxide-ammonia solution for fiber discrimination use (manufactured by Kishida Chemical Co., Ltd.) for the purpose of removing the cellulose-based fibers (C), and the cellulose-based fibers (C) are dissolved in the solution, thereby separating the alkali-resistant fibers (D) from the cellulose-based fibers (C). The alkali-resistant fibers (D) thus separated is dried at 105° C. until the mass of the dried product reaches a constant value, and the dried product is weighed ($W_2$ (g)). The content of the alkali-resistant fibers (D) in the layered formed sheet is calculated in accordance with the following formula.

$$\text{(Content of the alkali-resistant fibers } (D) \text{ in layered formed sheet)} = (W_2/W_1) \times 100$$

<(E) Other Powder>

The layered formed sheet in the present invention may further contain a powder other than the aluminosilicate source (A) as other powder (E). Examples of the other powder (E) include silica fume, calcium carbonate, bentonite, and a calcium sulfate derivative (e.g., gypsum dihydrate, desulfurization gypsum, α- or β-hemihydrate gypsum, and anhydrous gypsum), and these substances may be used singly, or two or more of them may be used in combination. When the layered formed sheet contains silica fume, more excellent dimensional stability can be achieved in the layered formed sheet. Therefore, use of silica fume is preferred.

When the layered formed sheet in the present invention contains the other powder (E), the content of the other powder (E) is preferably 0.1% by mass or more, more preferably 1% by mass or more, still more preferably 2% by mass or more, particularly preferably 3% by mass or more, and is preferably 15% by mass or less, more preferably 13% by mass or less, still more preferably 10% by mass or less, particularly preferably 8% by mass or less, related to a total solid content in the layered formed sheet. When the content is equal to or more than the above-mentioned lower limit and is equal to or less than the above-mentioned upper limit, the above-mentioned effect of the addition of the other powder (E) can be achieved.

<(F) Slag Activator>

The cured composite in the present invention may further contain a slag activator (F). When a slag activator (F) is added to the curable composition in the present invention, a cured composite having higher bending strength can be produced. Examples of the slag activator (F) include aluminum sulfate, calcium hydroxide, sodium sulfate and sodium aluminate, and these substances may be used singly, or two or more of them may be used in combination. Among these substances, from the viewpoint that a cured composite having higher bending strength can be produced, it is preferred that the cured composite contains at least one selected from the group consisting of aluminum sulfate, calcium hydroxide and sodium aluminate.

When the cured composite in the present invention contains the slag activator (F), the content is preferably 0.1% by mass or more, more preferably 0.5% by mass or more, still more preferably 1% by mass or more, particularly preferably 1.5% by mass or more, and is preferably 6% by mass or less, more preferably 5% by mass or less, still more preferably 4% by mass or less, related to a total solid content in the cured composite. When the content is equal to or more than the above-mentioned lower limit and is equal to or less than the above-mentioned upper limit, the above-mentioned effect of the addition of the slag activator (F) can be achieved.

The thickness of the layered formed sheet may be selected appropriately depending on the intended use, and is generally 4 mm or more and 30 mm or less. When the layered formed sheet is used as, for example, a wall material, the thickness of the layered formed sheet is preferably 4 mm or more and 20 mm or less. When the layered formed sheet is used as a flooring material, the thickness of the layered formed sheet is preferably 8 mm or more and 30 mm or less. The thickness of the layered formed sheet can be measured by the method described in the section "Examples" below.

The bulk density of the layered formed sheet may be selected appropriately depending on the intended use, and is generally 0.5 g/cm$^3$ or more and 2.0 g/cm$^3$ or less. The bulk density of the layered formed sheet is preferably 0.8 g/cm$^3$ or more, more preferably 1.0 g/cm$^3$ or more, and is preferably 1.8 g/cm$^3$ or less, more preferably 1.6 g/cm$^3$ or less. The bulk density of the layered formed sheet can be measured by the method described in the section "Examples" below.

The impact strength of the layered formed sheet as measured in accordance with JIS K 7111 is preferably 2 kJ/m$^2$ or more, more preferably 2.5 kJ/m$^2$ or more, still more preferably 3 kJ/m$^2$ or more. The upper limit of the impact strength is not particularly limited. The impact strength is generally 7 kJ/m$^2$ or less. When the impact strength is equal to or more than the above-mentioned lower limit, the breakage of the layered formed sheet due to the application of impacts when, for example, the layered formed sheet is used as wall material can be prevented, and the breakage of the layered formed sheet which is caused by a falling object or the like when the layered formed sheet is used as a flooring material can be prevented.

The bending strength of the layered formed sheet as measured in accordance with JIS A 1408 is preferably 10 N/mm$^2$ or more, more preferably 11 N/mm$^2$ or more, more preferably 12 N/mm$^2$ or more, still more preferably 13 N/mm$^2$ or more, particularly preferably 17 N/mm$^2$ or more. The upper limit of the bending strength is not particularly limited. The bending strength is generally 35 N/mm$^2$ or less.

<Method for Manufacturing Layered Formed Sheet>

The layered formed sheet according to the present invention is preferably produced by a paper-making method. The term "paper-making method" refers to a method in which a slurry-like curable composition prepared by suspending a solid component such as an aluminosilicate and fibrous components such as the cellulose-based fibers (C) and the alkali-resistant fibers (D) in an aqueous medium is scooped with a mesh and the solid material retained on the mesh is formed. Examples of the paper-making method include: a cylinder-type method or a fourdrinier-type method, in which the solid materials each having a thin sheet-like form is laminated sequentially to produce a layered formed sheet having a desired thickness; and a flow-on-type method, in which a certain thickness is secured by one cycle or several cycles of paper-making procedures using a dense curable composition. In the paper-making method, the layered formed sheet can be mass-produced in a batch-mode mechanically and continuously, and the produced layered formed sheet can have uniform and stable performance. In addition, it is generally possible to produce a relatively thin sheet having a thickness of about 2 to 30 mm. The production of the relatively thin sheet is extremely difficult by a production method other than the paper-making method (e.g., a casting method).

The layered formed sheet according to the present invention can be produced by, for example, a method comprising:

a step for mixing the aluminosilicate source (A), the alkaline metal hydroxide (B), the cellulose-based fibers (C), the alkali-resistant fibers other than cellulose-based fibers (D) and water together to prepare a curable composition;

a step for producing formed sheets using the curable composition by a paper-making method; and a step for laminating two or more of the formed sheets on each other.

When the other powder (E) and the slag activator (F) which may be used as required are used, these optional components can be added in the first mixing step for mixing the aluminosilicate source (A), the alkaline metal hydroxide (B), the cellulose-based fibers (C), the alkali-resistant fibers other than cellulose-based fibers (D) and water together.

As the aluminosilicate source (A), the alkaline metal hydroxide (B), the cellulose-based fibers (C) and the alkali-resistant fibers other than cellulose-based fibers (D) which are used in the production method, and the other powder (E) and the slag activator (F) which can be used as required, those substances which are mentioned in the sections <(A) Aluminosilicate source>, <(B) Alkaline metal hydroxide>, <(C) Cellulose-based fibers>, <(D) Alkali-resistant fibers other than cellulose-based fibers>, <(E) Other powder> and <(F) Slag activator> above can be used.

The preparation method to be employed in the step for preparing the curable composition is not particularly limited. From the viewpoint that a curable composition in which solid components are dispersed uniformly can be produced, it is preferred to charge and agitate the cellulose-based fibers (C) in an agitator having water introduced therein, then add and agitate the aluminosilicate (A), the alkaline metal hydroxide (B) and optionally the other powder (E) and the slag activator (F), and finally add the alkali-resistant fibers (D). The order of the addition of the components (A) and (B) and the optional components (E) and (F) is not particularly limited. The amount of water is not particularly limited. From the viewpoint that a uniform curable composition can be obtained without adding an excessive amount of water to the curable composition, the solid material concentration in the step for preparing the curable composition is generally 10% by mass or more and 25% by mass or less.

As the paper-making method, a cylinder-type, a fourdrinier-type or a flow-on-type can be employed. From the viewpoint that it is possible to produce layered formed sheets having a wide varieties of thickness ranging from a smaller thickness to a larger thickness, a cylinder-type is preferably employed. Therefore, in a preferred aspect of the present invention, the step for producing the formed sheet by the paper-making method comprises scooping the curable composition with a cylinder wire.

In the cylinder-type method, the solid material concentration in the step for preparing the curable composition is generally 10% by mass or more and 25% by mass or less. The prepared curable composition is diluted with process circulating water to a solid material concentration of generally 3% by mass or more and 10% by mass or less, and the diluted curable composition is supplied to the cylinder wire and is scooped with the cylinder wire into a formed sheet. In the cylinder-type method, the solid material scooped with a single cylinder wire or two to six contiguous cylinder wires is adhered into felt to produce a formed sheet, and the formed sheet is laminated to a desired thickness while winding the formed sheet with a making roll. Therefore, continuous production is possible. As for the procedures and conditions to be employed in the cylinder-type method, commonly employed procedures and conditions may be employed.

In the production method, two or more of the formed sheet produced by the paper-making method are laminated. The formed sheet is laminated with a making roll until a desired thickness is achieved, and the laminated product is subjected to a dehydration pressing, curing and drying to produce the layered formed sheet. The pressure to be employed for the dehydration pressing is generally 20 $kg/cm^2$ to 300 $kg/cm^2$, and the pressurization dwell time is generally 10 to 60 minutes. The curing is generally carried out under the conditions including a temperature of 50° C. to 90° C. and a relative humidity of 80% to 100% for 8 to 55 hours.

The drying method is not particularly limited, as long as a uniformly dried layered formed sheet can be produced. In general, the equilibrium moisture content (e.g., a moisture water content in the layered formed sheet when the layered formed sheet is stored in a well-ventilated room for 7 days) of the layered formed sheet is about 6% to about 10%. Therefore, the layered formed sheet is dried in such a manner that a water content at the same level as the equilibrium moisture content is achieved. The water content and the equilibrium moisture content of the layered formed sheet can be measured simply using a Kett moisture meter. Alternatively, the water content and the equilibrium moisture content may also be measured by weighing the layered formed sheet ($W_3$) after the drying, then weighing the layered formed sheet that is dried at 105° C. with an air drier equipped with an agitator until the mass of the layered formed sheet becomes a constant value ($W_4$), and then calculating in accordance with the following formula.

$$\{(W_3-W_4)/W_4\}\times100$$

The layered formed sheet produced by the above method is derived from a curable composition having excellent uniformity due to a specified composition, and therefore the layered formed sheet can have all of high bending strength, high impact strength and high dimensional stability.

Examples

The present invention will be explained in more detail by way of Examples and Comparative Examples. However, the present invention is not limited to these Examples. The properties in Examples and Comparative Examples were measured or evaluated by the following methods.

[Measurement of Thickness]

The thickness of a layered formed sheet to be measured was measured at 6 sites using digital venire calipers, and an average value of the measurement values was defined as the thickness of the layered formed sheet.

[Method for Measuring Bulk Density]

A bulk density was measured in accordance with JIS A 5430. More specifically, a layered formed sheet to be measured was placed in an air drier equipped with an agitator and was then dried at 105° C.±5° C. for 24 hours, and the bulk density was determined from the mass and volume of the layered formed sheet.

[Method for Measuring Bending Strength]

Four strip specimens each having a length of about 180 mm and a width of about 50 mm were cut out from a layered formed sheet to be measured. Subsequently, in order to adjust the water content in each of the specimen at the time point of the measurement to a constant value, the specimens were dried in an air drier equipped with an agitator of which the temperature was set at 40° C. for 72 hours. The bending strength of each of the specimens was measured in accordance with JIS A 1408, and an average value of the measurement values was employed as the bending strength. The bending strength was measured using autograph "AG500-B" manufactured by Shimadzu Corporation in a center loading mode under the conditions including a bending span of 14.6 cm and a test speed (loading head speed) of 20 mm/min.

[Method for Measuring Impact Strength]

Six strip specimens each having a length of about 80 mm and a width of about 10 mm were cut out from a layered formed sheet to be measured. Subsequently, in order to adjust the water content in each of the specimen at the time point of the measurement to a constant value, the specimens were dried in an air drier equipped with an agitator of which the temperature was set at 40° C. for 72 hours. The impact strength of each of the specimens was measured in accordance with JIS K 7111 "Test method for plastic-Charpy impact strength", and an average value of the measurement values was employed as the impact strength. The impact strength was measured using a Charpy (digital) impact test machine, model "DG-CB" manufactured by Toyo Seiki Seisaku-sho, Ltd.

[Method for Measuring Dimensional Change Ratio]

The dimensional change ratio of a layered formed sheet was measured in accordance with JIS A 5430.

Firstly, a layered formed sheet to be measured was placed in a drier, then the temperature of the drier was kept at 60° C.±3° C. for 24 hours, and then the layered formed sheet was removed from the drier. The removed layered formed sheet was placed in a desiccator that had been humidified with silica gel, and was then allowed to leave until the temperature reached 20±1.5° C. Subsequently, a milky glass was bonded onto the layered formed sheet, then gauge lines were carved in such a manner that the distance between the gauge lines became about 140 mm, then the length between the gauge lines was measured with a comparator having an accuracy of 1/500 mm, and the measured length was defined as $L_1$ (mm). Subsequently, the layered formed sheet was laid on end in such a manner that the direction of the length of the layered formed sheet became horizontal, and then the layered formed sheet was immersed in water at 20° C.±1.5° C. in such a manner that the upper end of the layered formed sheet was located at about 30 mm below the water surface. After 24 hours, the layered formed sheet was removed from the water, water adhered to the layered formed sheet was swabbed, then the length between the gauge lines was measured again, and the measured length was defined as $L_2$ (mm). The dimensional change ratio Y (%) due to the absorption of water was calculated in accordance with the following formula.

$$\text{Change ratio of length due to absorption of water}$$
$$Y = \{(L_2 - L_1)/L_1\} \times 100$$

Example 1

Pulp (a NBKP, "Cellofiber" manufactured by PALTEK Corporation) (3% by mass) that served as the cellulose-based fibers (C) was dispersed in water. The resultant dispersion was mixed with a blast furnace slag (specific surface area: 4000 $cm^2/g$) (80.5% by mass) and fly ash ("Yonden fly ash type-II": manufactured by Yonden Business Co., Inc.) (5% by mass) that served as the aluminosilicate sources (A), slaked lime ("Industrial slaked lime No. 1": manufactured by Kochi Sekkai Kogyou) (5% by mass) that served as the alkaline metal hydroxide (B), and silica fume ("EFACO silica fume": manufactured by Tomoe Engineering Co., Ltd.) (5% by mass) that served as the other powder (E) with a mixer. To the resultant mixture was added PVA1 (manufactured by Kuraray Co., Ltd.) (1.5% by mass) that served as the alkali-resistant fibers (D). The resultant mixture was further agitated to produce a slurry-like curable composition having a solid material concentration of 16% by mass. The curable composition was transferred to a constant feeding apparatus. Subsequently, the slurry was fed from a feed tank in the constant feeding apparatus to a cylinder wire process, then the solid material concentration in the slurry was adjusted to 4% by mass with process circulating water, and the resultant product was subjected to a paper-making procedure using Mini Hatschek machine. Subsequently, a formed sheet produced in the cylinder wire process was layered to 10 layers with a making roller, and the layered formed sheet that was in a wet condition was pressed for 20 minutes while applying a pressure of 75 $kg/cm^2$ to squeeze a liquid component therefrom. The formed sheet after the squeezing of the liquid component had a thickness of 4.6 mm and a bulk density of 1.35 $g/cm^3$. The formed sheet was placed in a constant-temperature/constant-humidity curing apparatus and was then cured therein under the conditions including at a temperature of 90° C. and a saturated humidity (RH98%) for 48 hours, and was then dried in an air drier equipped with an agitator at 60° C. for 16 hours to produce a layered formed sheet.

The layered formed sheet thus produced was subjected to the evaluation in the above-mentioned manners. The results are shown in Table 2.

Examples 2 to 4

Layered formed sheets were produced and evaluated in the same manner as in Example 1, except that the content ratio of the blast furnace slag and the content ratio of the alkaline metal hydroxide (B) were changed as shown in Table 2.

Examples 5 to 7

Layered formed sheets were produced and evaluated in the same manner as in Example 3, except that the types of the alkali-resistant fibers other than cellulose-based fibers (D) were changed as shown in Table 2.

Example 8

A layered formed sheet was produced and evaluated in the same manner as in Example 2, except that a blast furnace slag having a specific surface area of 6000 cm²/g was used in place of a blast furnace slag having a specific surface area of 4000 cm²/g.

Example 9

A layered formed sheet was produced and evaluated in the same manner as in Example 3, except that a blast furnace slag having a specific surface area of 6000 cm²/g was used in place of a blast furnace slag having a specific surface area of 4000 cm²/g and PVA2 was used in place of PVA1.

Examples 10 to 11

Layered formed sheets were produced and evaluated in the same manner as in Example 9, except that the content ratio of the blast furnace slag and the content ratio of fly ash were changed as shown in Table 2.

Examples 12 to 13

Layered formed sheets were produced and evaluated in the same manner as in Example 11, except that the content ratio of the blast furnace slag and the content ratio of the silica fume were changed as shown in Table 2.

Example 14

A layered formed sheet was produced and evaluated in the same manner as in Example 3, except that the content ratio of the blast furnace slag and the content ratio of the pulp were changed as shown in Table 2.

Example 15

A layered formed sheet was produced and evaluated in the same manner as in Example 6, except that the content ratio of the blast furnace slag and the content ratio of the alkali-resistant fibers other than cellulose-based fibers (D) were changed as shown in Table 2.

Example 16

A layered formed sheet was produced and evaluated in the same manner as in Example 1, except that silica fume and gypsum dihydrate were added in place of silica fume as the other powder (E) and the content ratio of the blast furnace slag and the content ratio of the alkaline metal hydroxide (B) were changed as shown in Table 2.

Example 17

A layered formed sheet was produced and evaluated in the same manner as in Example 1, except that the content ratio of the blast furnace slag and the content ratio of the alkaline metal hydroxide (B) were changed as shown in Table 2 and the dispersion of the cellulose-based fibers (C) was mixed with the blast furnace slag and the fly ash that served as the aluminosilicate sources (A), slaked lime that served as the alkaline metal hydroxide (B), and silica fume that served as the other powder (E) and aluminum sulfate that served as the slag activator (F) with a mixer instead that the dispersion of the cellulose-based fibers (C) was mixed with the blast furnace slag and the fly ash that served as the aluminosilicate sources (A), slaked lime that served as the alkaline metal hydroxide (B) and silica fume that served as the other powder (E) with a mixer.

Examples 18 to 19

Layered formed sheets were produced and evaluated in the same manner as in Example 2, except that silica fume and gypsum dihydrate were added in place of silica fume as the other powder (E) and the content ratio of the blast furnace slag and the type of the alkali-resistant fibers other than cellulose-based fibers (D) were changed as shown in Table 2.

Examples 20 to 21

Layered formed sheets were produced and evaluated in the same manner as in Example 17, except that silica fume and gypsum dihydrate were added in place of silica fume as the other powder (E), the content ratio of the blast furnace slag, the content ratio of the alkaline metal hydroxide (B) and the content ratio of the slag activator (F) were changed as shown in Table 2, and the temperature and time of the curing were changed from 90° C. and 48 hours to 60° C. and 24 hours.

Example 22

A layered formed sheet was produced and evaluated in the same manner as in Example 1, except that fly ash and red mud were added in place of fly ash and the content ratio of the blast furnace slag and the content ratio of fly ash were changed as shown in Table 2.

Example 23

A layered formed sheet was produced and evaluated in the same manner as in Example 4, except that fly ash and red mud were added in place of fly ash and the content ratio of the blast furnace slag, the content ratio of fly ash and the content ratio of the silica fume were changed as shown in Table 2.

Example 24

A layered formed sheet was produced and evaluated in the same manner as in Example 8, except that the content ratio of the blast furnace slag was changed from 75.5% by mass to 56% by mass and, because of this change, the content ratio of fly ash and the content ratio of the alkaline metal hydroxide (B) were also changed as shown in Table 2.

Comparative Example 1

It was tried to produce a layered formed sheet in the same manner as in Example 1, except that the alkaline metal hydroxide (B) was not added and, because of this change, the content ratio of the blast furnace slag was changed as shown in Table 2. However, the composition was not cured. Accordingly, the evaluation of a layered formed sheet could not be performed.

Comparative Example 2

A layered formed sheet was produced and evaluated in the same manner as in Example 3, except that the alkali-resistant fibers other than cellulose-based fibers (D) was not added and, because of this change, the content ratio of the blast furnace slag was changed as shown in Table 2.

Comparative Example 3

A layered formed sheet was produced and evaluated in the same manner as in Example 1, except that the content ratio of the blast furnace slag was changed from 80.5% by mass to 55% by mass and, because of this change, the content ratio of the alkaline metal hydroxide (B), the content of the cellulose-based fibers (C) and the content ratio of the alkali-resistant fibers other than cellulose-based fibers (D) were also changed as shown in Table 2.

Comparative Example 4

A layered formed sheet was produced and evaluated in the same manner as in Example 3, except that a blast furnace slag having a specific surface area of 800 cm²/g was used in place of the blast furnace slag having a specific surface area of 4000 cm²/g.

Comparative Example 5

A layered formed sheet was produced and evaluated in the same manner as in Example 3, except that a blast furnace slag having a specific surface area of 10000 cm²/g was used in place of the blast furnace slag having a specific surface area of 4000 cm²/g.

Comparative Example 6

A layered formed sheet was produced and evaluated in the same manner as in Example 1, except that the content ratio of the blast furnace slag was changed from 80.5% by mass to 90.5% by mass and the content ratio of fly ash and the content ratio of the silica fume were changed as shown in Table 2.

The properties of the fibers used in Examples and Comparative Examples are shown in Table 1 below. In Table 2, the compositions employed in Examples and Comparative Examples and the results of the evaluation of the layered formed sheets produced in Examples and Comparative Examples are shown.

TABLE 1

| | | Properties of fibers | | | |
|---|---|---|---|---|---|
| | | Fineness (dtex) | Average fiber diameter (μm) | Average fiber length (mm) | Aspect ratio |
| PVA1 | Polyvinyl alcohol-based fiber manufactured by Kuraray Co., Ltd. | 0.5 | 7.0 | 4 | 571 |
| PVA2 | Polyvinyl alcohol-based fiber manufactured by Kuraray Co., Ltd. | 2.0 | 14.0 | 6 | 429 |
| PVA3 | Polyvinyl alcohol-based fiber manufactured by Kuraray Co., Ltd. | 4.0 | 20.0 | 6 | 300 |
| PVA4 | Polyvinyl alcohol-based fiber manufactured by Kuraray Co., Ltd. | 7.0 | 26.0 | 6 | 231 |
| PP | Polypropylene fibers manufactured by Daiwabo Co., Ltd. | 2.2 | 17.0 | 6 | 353 |

TABLE 2

| | Aluminosilicate source (A) | | | | Alkaline metal hydroxide (B) | Cellulose-based fibers (C) | Alkali-resistant fibers other than cellulose-based fibers | | Other powder (E) | | Slag activator (F) | | | | | |
|---|---|---|---|---|---|---|---|---|---|---|---|---|---|---|---|---|
| | Blast furnace slag | | Fly ash | Red mud | Slaked lime | Pulp | | | Silica fume | Gypsum dihydrate | Aluminum sulfate | | | | | |
| | Specific surface area (cm²/g) | (% by mass) | (% by mass) | (% by mass) | (% by mass) | (% by mass) | Type | (C) (D) (% by mass) | (% by mass) | (% by mass) | (% by mass) | Thickness (mm) | Bulk specific gravity (g/cm³) | Bending strength (N/mm²) | Impact strength (kJ/m²) | Dimensional change ratio (%) |
| Example 1 | 4000 | 80.5 | 5 | — | 5 | 3 | PVA1 | 1.5 | 5 | — | — | 4.6 | 1.35 | 15.0 | 4.20 | 0.117 |
| Example 2 | 4000 | 75.5 | 5 | — | 10 | 3 | PVA1 | 1.5 | 5 | — | — | 4.7 | 1.34 | 16.6 | 4.33 | 0.123 |
| Example 3 | 4000 | 71 | 5 | — | 14.5 | 3 | PVA1 | 1.5 | 5 | — | — | 4.7 | 1.32 | 20.4 | 3.42 | 0.127 |
| Example 4 | 4000 | 65.5 | 5 | — | 20 | 3 | PVA1 | 1.5 | 5 | — | — | 4.6 | 1.38 | 23.1 | 3.59 | 0.155 |
| Example 5 | 4000 | 71 | 5 | — | 14.5 | 3 | PVA3 | 1.5 | 5 | — | — | 4.6 | 1.36 | 19.6 | 3.44 | 0.138 |
| Example 6 | 4000 | 71 | 5 | — | 14.5 | 3 | PVA4 | 1.5 | 5 | — | — | 4.8 | 1.39 | 19.2 | 3.51 | 0.119 |
| Example 7 | 4000 | 71 | 5 | — | 14.5 | 3 | PP | 1.5 | 5 | — | — | 4.8 | 1.36 | 14.3 | 3.67 | 0.143 |
| Example 8 | 6000 | 75.5 | 5 | — | 10 | 3 | PVA1 | 1.5 | 5 | — | — | 4.8 | 1.34 | 19.5 | 4.25 | 0.095 |
| Example 9 | 6000 | 71 | 5 | — | 14.5 | 3 | PVA2 | 1.5 | 5 | — | — | 4.8 | 1.31 | 20.4 | 4.38 | 0.099 |
| Example 10 | 6000 | 66 | 10 | — | 14.5 | 3 | PVA2 | 1.5 | 5 | — | — | 4.8 | 1.30 | 18.3 | 4.26 | 0.113 |
| Example 11 | 6000 | 76 | — | — | 14.5 | 3 | PVA2 | 1.5 | 5 | — | — | 4.7 | 1.32 | 20.1 | 3.71 | 0.127 |
| Example 12 | 6000 | 81 | — | — | 14.5 | 3 | PVA2 | 1.5 | — | — | — | 4.6 | 1.34 | 21.3 | 3.73 | 0.146 |
| Example 13 | 6000 | 71 | — | — | 14.5 | 3 | PVA2 | 1.5 | 10 | — | — | 4.9 | 1.30 | 19.8 | 3.55 | 0.118 |
| Example 14 | 4000 | 65 | 5 | — | 14.5 | 9 | PVA1 | 1.5 | 5 | — | — | 5.3 | 1.25 | 21.9 | 3.97 | 0.143 |
| Example 15 | 4000 | 68.5 | 5 | — | 14.5 | 3 | PVA4 | 4.0 | 5 | — | — | 4.9 | 1.29 | 18.4 | 3.95 | 0.136 |

TABLE 2-continued

| | Aluminosilicate source (A) | | | | Alkaline metal hydroxide (B) | Cellulose-based fibers (C) | Alkali-resistant fibers other than cellulose-based fibers | | Other powder (E) | | | Slag activator (F) | | | | | |
|---|---|---|---|---|---|---|---|---|---|---|---|---|---|---|---|---|---|
| | Blast furnace slag | | Fly ash | Red mud | Slaked lime | Pulp | | | Silica fume | Gypsum dihydrate | Aluminum sulfate | | | Bending | | | Dimensional |
| | Specific surface area (cm²/g) | (% by mass) | (% by mass) | (% by mass) | (% by mass) | (% by mass) | Type | (C)(D) (% by mass) | (% by mass) | drate (% by mass) | (% by mass) | Thickness (mm) | Bulk specific gravity (g/cm³) | strength (N/mm²) | Impact strength (kJ/m²) | change ratio (%) |
| Example 16 | 4000 | 68 | 5 | — | 14.5 | 3 | PVA1 | 1.5 | 5 | 3 | — | 4.7 | 1.31 | 20.1 | 3.54 | 0.129 |
| Example 17 | 4000 | 68 | 5 | — | 14.5 | 3 | PVA1 | 1.5 | 5 | — | 3 | 4.7 | 1.34 | 21.2 | 3.46 | 0.139 |
| Example 18 | 4000 | 69.5 | 5 | — | 10 | 3 | PVA2 | 1.5 | 5 | 6 | — | 4.3 | 1.37 | 23.0 | 3.06 | 0.148 |
| Example 19 | 4000 | 66.5 | 5 | — | 10 | 3 | PVA2 | 1.5 | 5 | 9 | — | 4.1 | 1.41 | 25.0 | 3.38 | 0.158 |
| Example 20 | 4000 | 65.0 | 5 | — | 7 | 3 | PVA1 | 1.5 | 5 | 10.2 | 3.3 | 5.7 | 1.51 | 33.0 | 3.03 | 0.180 |
| Example 21 | 4000 | 56.0 | 5 | — | 7 | 3 | PVA1 | 1.5 | 5 | 19.2 | 3.3 | 5.8 | 1.49 | 31.4 | 3.35 | 0.162 |
| Example 22 | 4000 | 57.5 | 5 | 23 | 5 | 3 | PVA1 | 1.5 | 5 | — | — | 4.6 | 1.38 | 20.1 | 4.43 | 0.103 |
| Example 23 | 4000 | 58 | 5 | 12.5 | 20 | 3 | PVA1 | 1.5 | — | — | — | 4.7 | 1.40 | 21.4 | 4.21 | 0.100 |
| Example 24 | 6000 | 56 | 20 | — | 14.5 | 3 | PVA1 | 1.5 | 5 | — | — | 4.8 | 1.25 | 16.8 | 3.06 | 0.171 |

TABLE 3

| | Aluminosilicate source (A) | | | | Alkaline metal hydroxide (B) | Cellulose-based fibers (C) | Alkali-resistant fibers other than cellulose-based fibers | | Other powder (E) | | | Slag activator (F) | | | | | |
|---|---|---|---|---|---|---|---|---|---|---|---|---|---|---|---|---|---|
| | Blast furnace slag | | Fly ash | Red mud | Slaked lime | Pulp | | | Silica fume | Gyp sum | Aluminum sulfate | | | Bending | | | Dimensional |
| | Specific surface area (cm²/g) | (% by mass) | (% by mass) | (% by mass) | (% by mass) | (% by mass) | Type | (C)(D) (% by mass) | (% by mass) | drate (% by mass) | (% by mass) | Thickness (mm) | Bulk specific gravity (g/cm³) | strength (N/mm²) | Impact strength (kJ/m²) | change ratio (%) |
| Comparative Example 1 | 4000 | 85.5 | 5 | — | — | 3 | PVA1 | 1.5 | 5 | — | — | not cured | | | | |
| Comparative Example 2 | 4000 | 72.5 | 5 | — | 14.5 | 3 | — | — | 5 | — | — | 4.3 | 1.40 | 10.8 | 1.26 | 0.138 |
| Comparative Example 3 | 4000 | 55 | 5 | — | 20 | 10 | PVA1 | 5 | 5 | — | — | 5.4 | 1.22 | 16.4 | 1.87 | 0.238 |
| Comparative Example 4 | 800 | 71 | 5 | — | 14.5 | 3 | PVA1 | 1.5 | 5 | — | — | 4.6 | 1.36 | 6.2 | 1.35 | 0.183 |
| Comparative Example 5 | 10000 | 71 | 5 | — | 14.5 | 3 | PVA1 | 1.5 | 5 | — | — | 4.5 | 1.31 | 12.6 | 1.53 | 0.162 |
| Comparative Example 6 | 4000 | 90.5 | — | — | 5 | 3 | PVA1 | 1.5 | — | — | — | 4.3 | 1.41 | 11.4 | 2.04 | 0.194 |

All of the layered formed sheets produced in Examples 1 to 24 had high bending strength, high impact strength and high dimensional stability.

On the other hand, the layered formed sheet produced in Comparative Example 2 in which the alkali-resistant fibers (D) were not added showed remarkably poor bending strength and remarkably poor impact strength.

The layered formed sheet produced in Comparative Example 3 in which the content of the blast furnace slag having a specific surface area of 1000 cm²/g or more and 9000 cm²/g or less was 55% by mass or less related to a total solid content in the curable composition showed remarkably poor impact strength and a remarkably high dimensional change ratio.

The layered formed sheet produced in Comparative Example 4 in which the blast furnace slag having a specific surface area of less than 1000 cm²/g was contained in an amount of 60% by mass or more related to a total solid content in the curable composition showed remarkably poor bending strength, remarkably poor impact strength and a high dimensional change ratio.

The layered formed sheet produced in Comparative Example 5 in which the blast furnace slag having a specific surface area of more than 9000 cm²/g was contained in an amount of 60% by mass or more related to a total solid content in the curable composition showed remarkably poor bending strength, remarkably poor impact strength and a high dimensional change ratio.

The layered formed sheet produced in Comparative Example 6 in which the content of the blast furnace slag having a specific surface area of 1000 cm²/g or more and 9000 cm²/g or less was more than 90% by mass related to a total solid content in the curable composition showed remarkably poor bending strength and a high dimensional change ratio.

INDUSTRIAL APPLICABILITY

The layered formed sheet according to the present invention has high bending strength, high impact strength and high dimensional stability. Therefore, the layered formed sheet according to the present invention can be used usefully as various architectural materials such as, but not particularly limited to, an interior material, an exterior material, a flooring material, a wall material, a ceiling material, a partitioning material, a roof material and a tiling material.

The invention claimed is:

1. A layered formed sheet, comprising:

two or more formed sheets each formed from a curable composition comprising (A) an aluminosilicate source, (B) an alkaline metal hydroxide, (C) cellulose-based fibers, and (D) alkali-resistant fibers other than the cellulose-based fibers, wherein the aluminosilicate source (A) comprises a blast furnace slag, and a content of a blast furnace slag having a specific surface area of 1000 cm$^2$/g or more and 9000 cm$^2$/g or less is 57.5% by mass or more and 90% by mass or less related to a total solid content in the curable composition.

2. The layered formed sheet according to claim 1, wherein a content of the alkaline metal hydroxide (B) is 3% by mass or more and 41% by mass or less related to the total solid content in the curable composition.

3. The layered formed sheet according to claim 1, wherein a content of the cellulose-based fibers (C) is 0.5% by mass or more and 15% by mass or less related to a total solid content in the layered formed sheet.

4. The layered formed sheet according to claim 1, wherein a content of the alkali-resistant fibers (D) is 0.1% by mass or more and 5% by mass or less related to a total solid content in the layered formed sheet.

5. The layered formed sheet according to claim 1, wherein the alkaline metal hydroxide (B) is slaked lime.

6. The layered formed sheet according to claim 1, wherein the cellulose-based fibers (C) are pulp.

7. The layered formed sheet according to claim 1, wherein the alkali-resistant fibers (D) have an average fiber diameter of 100 μm or less and an aspect ratio of 50 or more and 2000 or less.

8. The layered formed sheet according to claim 1, wherein the alkali-resistant fibers (D) are at least one type of fibers selected from the group consisting of polyvinyl alcohol-based fibers, polyethylene fibers, polypropylene fibers, acrylic fibers, aramid fibers, and nylon fibers.

9. The layered formed sheet according to claim 1, wherein an impact strength of the layered formed sheet is 2 kJ/m$^2$ or more as measured in accordance with JIS K 7111.

* * * * *